United States Patent
Janecek et al.

(10) Patent No.: US 9,509,181 B2
(45) Date of Patent: Nov. 29, 2016

(54) TRANSVERSE FLUX STATOR GEOMETRY

(71) Applicant: Electric Torque Machines, Inc., Flastaff, AZ (US)

(72) Inventors: Thomas F. Janecek, Flagstaff, AZ (US); John M. Dyer, Flagstaff, AZ (US); Scott Reynolds, Flagstaff, AZ (US); Tyler K. Williams, Flagstaff, AZ (US)

(73) Assignee: Electric Torque Machines Inc., Flagstaff, AZ (US)

( * ) Notice: Subject to any disclaimer, the term of this patent is extended or adjusted under 35 U.S.C. 154(b) by 145 days.

(21) Appl. No.: 14/101,415

(22) Filed: Dec. 10, 2013

(65) Prior Publication Data

US 2015/0162786 A1    Jun. 11, 2015

(51) Int. Cl.
| H02K 1/12 | (2006.01) |
| H02K 21/22 | (2006.01) |
| H02K 1/14 | (2006.01) |
| H02K 15/02 | (2006.01) |
| H02K 21/14 | (2006.01) |
| H02K 1/27 | (2006.01) |

(52) U.S. Cl.
CPC ............ *H02K 1/145* (2013.01); *H02K 15/022* (2013.01); *H02K 21/145* (2013.01); *H02K 21/227* (2013.01); *H02K 1/2786* (2013.01); *Y10T 29/49009* (2015.01)

(58) Field of Classification Search
CPC ... H02K 1/145; H02K 2201/12; H02K 3/525
USPC ............................................ 310/156.02, 257
See application file for complete search history.

(56) References Cited

U.S. PATENT DOCUMENTS

| 5,877,576 A | 3/1999 | Cochimin et al. |
| 7,851,965 B2 | 12/2010 | Calley et al. |
| 7,868,508 B2 | 1/2011 | Calley et al. |
| 7,923,886 B2 | 4/2011 | Calley et al. |
| 8,053,944 B2 | 11/2011 | Calley et al. |
| 8,405,275 B2 | 3/2013 | Calley et al. |
| 2006/0255668 A1* | 11/2006 | Chen ...................... H02K 1/145 310/67 R |
| 2009/0322165 A1 | 12/2009 | Rittenhouse |
| 2011/0062817 A1* | 3/2011 | Makiyama ............. H02K 1/145 310/216.054 |
| 2011/0169365 A1* | 7/2011 | Calley .................. H02K 21/227 310/156.02 |
| 2011/0169366 A1 | 7/2011 | Calley et al. |

(Continued)

FOREIGN PATENT DOCUMENTS

| JP | 2005094951 A | 7/2005 |
| JP | WO 2009087835 A1 * | 7/2009 ............. H02K 1/145 |

(Continued)

OTHER PUBLICATIONS

Machine Translation, Ishikawa, WO 2009087835 A1, Jul. 16, 2009.*

*Primary Examiner* — Thomas Truong
(74) *Attorney, Agent, or Firm* — Invention To Patent Services; Alex R Hobson

(57) ABSTRACT

An electrical machine includes a rotor for rotation about a rotational axis, a coil arranged circumferentially with respect to and encircling the rotational axis, and a stator assembly. The stator assembly includes a unitary lamina comprising a plurality of extending members integral therewith, the extending members being bent to form a plurality of opposing extending members about the coil. The electrical machine is at least one of a transverse flux machine or a commutated flux machine. Methods of manufacturing stators for assembly with rotors to form electrical machines are also disclosed.

18 Claims, 16 Drawing Sheets

(56) References Cited

U.S. PATENT DOCUMENTS

| | | |
|---|---|---|
| 2011/0169381 A1 | 7/2011 | Calley et al. |
| 2011/0266808 A1 | 11/2011 | Dawson et al. |
| 2012/0119599 A1 | 5/2012 | Calley et al. |
| 2012/0119609 A1 | 5/2012 | Janecek et al. |
| 2012/0234108 A1 | 9/2012 | Janecek et al. |
| 2012/0235519 A1 | 9/2012 | Dyer et al. |
| 2012/0235668 A1 | 9/2012 | Janecek et al. |
| 2013/0002061 A1 | 1/2013 | Janecek et al. |
| 2013/0113320 A1 | 5/2013 | Calley et al. |
| 2013/0264905 A1 | 10/2013 | Calley et al. |
| 2013/0270928 A1* | 10/2013 | Nord ..................... H02K 1/145 310/12.26 |

FOREIGN PATENT DOCUMENTS

| | | | |
|---|---|---|---|
| KR | 200800061415 A | 3/2008 | |
| SE | WO 2012084905 A1 * | 6/2012 | ............. H02K 1/145 |

\* cited by examiner

TRANSVERSE FLUX STATOR GEOMETRY

FIELD OF THE INVENTION

The present invention relates generally to stators or rotors for electrical machines.

BACKGROUND OF THE INVENTION

Motors and alternators are typically designed for high efficiency, high power density, and low cost. While some motors and alternators are generally complicated in their assembly, so as to achieve higher performance characteristics, a design utilizing fewer components, or a well-engineered assembly, may provide a superior motor/alternator solution at a cheaper price point.

Most commonly, electric motors are of a radial flux type. To a far lesser extent, some electric motors are implemented as transverse flux machines and/or commutated flux machines. It is desirable to develop improved electric motor and/or alternator performance and/or configurability. Among other things, the present application relates to an improved stator for a transverse flux machine having an improved stator geometry facilitating cheaper manufacturing thereof.

SUMMARY OF THE INVENTION

According to one aspect of this disclosure, an electrical machine includes a rotor for rotation about a rotational axis, a coil arranged circumferentially with respect to and encircling the rotational axis, and a stator assembly. The stator assembly includes a unitary lamina comprising a plurality of extending members integral therewith, the extending members being bent to form a plurality of opposing extending members about the coil. The electrical machine is at least one of a transverse flux machine or a commutated flux machine.

According to another aspect of the disclosure, a method of manufacturing a stator for assembly with a rotor to form an electrical machine includes forming a lamina from a unitary piece having circular configuration by creating a plurality of gaps to define a plurality of extending members at an outer portion of the unitary piece. The method also includes bending the extending members in to form a space configured to receive a coil therein. The method further includes incorporating the coil into the space so that portions of the unitary piece of the lamina extend on opposing sides of the coil.

According to another aspect of the disclosure, a method of manufacturing a stator for assembly with a rotor to form an electrical machine includes forming a lamina from a unitary piece having an elongated rectangular configuration by creating a plurality of gaps to define a plurality of extending members along the unitary piece. The method also includes bending the extending members to form a space therebetween, separated by a connecting portion. The method further includes wrapping the lamina around a coil having an annular configuration, so that the extending members of the unitary piece of the lamina are positioned on opposing sides of the coil.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of electrical machines in accordance with one or more embodiments are shown in the drawings, in which like reference numerals designate like elements. The drawings form part of this original disclosure in which.

DETAILED DESCRIPTION OF THE ILLUSTRATED EMBODIMENT(S)

Figure 1B:
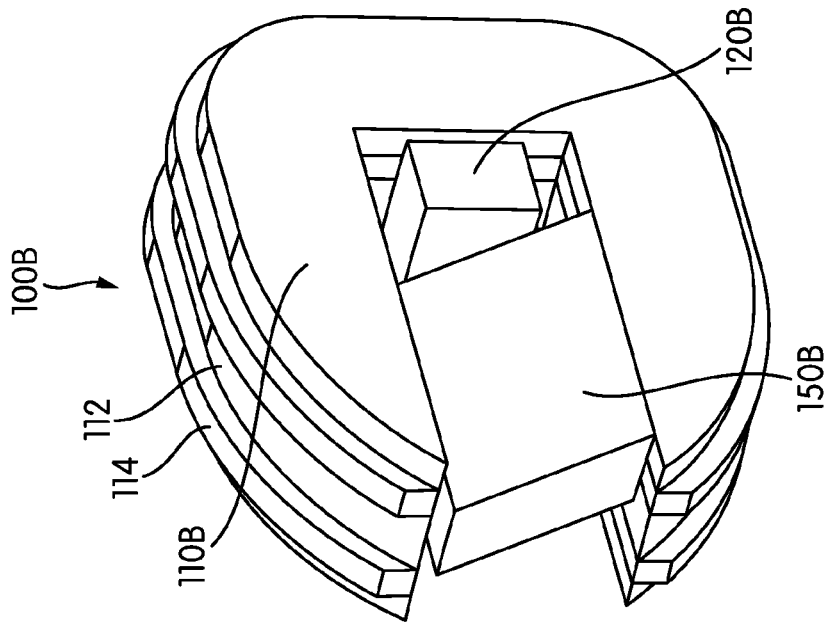
FIG. 1B illustrates an exemplary commutated flux machine in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments. As will become apparent, various changes may be made in the function and arrangement of the elements described in these embodiments without departing from the scope of the appended claims.

This application is related to an enhancement of the technology disclosed in U.S. patent application Ser. No. 13/797,671, which claims the benefit of U.S. patent application Ser. No. 13/291,373, now U.S. Pat. No. 8,405,275, which itself claims priority from provisional applications 61/453,075, 61/414,781, 61/414,769, and 61/414,774. Each of these applications is incorporated herein by reference in its entirety.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor.

Many prior electric motors have offered limited torque density. As used herein, "torque density" refers to Newton-meters of continuous torque produced per kilogram of active electrical and magnetic materials in the motor. In an exemplary embodiment, continuous torque may be defined as a level of output torque that produces a maximum (spatial) equilibrium temperature of 100 degrees Celsius in the motor stator, responsive to a load of duty type S1 as defined in International Electrotechnical Commission (IEC) standard 60034-1, given ambient temperature of 25 degrees Celsius and airflow of 8 kilometers per hour around the motor.

For example, many prior electric motors are configured with a torque density of between about 0.5 Newton-meters per kilogram and about 3 Newton-meters per kilogram. Consequently, a motor of sufficient torque and/or power for a particular application may be difficult or even impossible to fit in an available area, for example when a motor sized to produce sufficient torque becomes too massive to fit in a confined space.

In contrast, efficient, compact, and/or torque-dense electric motors may be achieved by utilizing a transverse flux machine and/or commutated flux machine configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the electrical machine operates, the electrical machine may be a pure "transverse" flux machine. In another exemplary embodiment, when a magnet and/or flux concentrating components are on a stator and/or are held stationary as the electrical machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

Moreover, there is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Figure 1A:
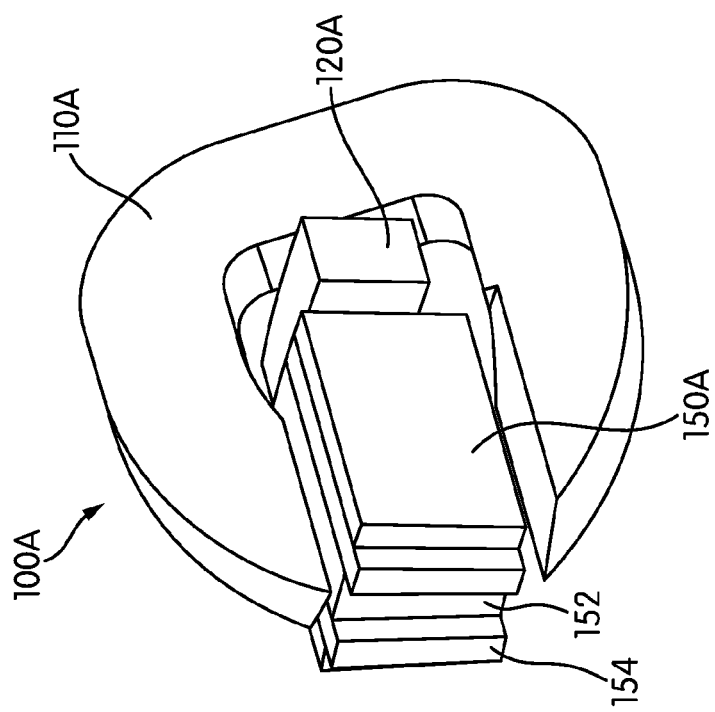
FIG. 1A illustrates an exemplary transverse flux machine in accordance with an exemplary embodiment.

In accordance with an exemplary embodiment, and with reference to FIG. 1A, an electrical machine, for example transverse flux machine (TFM) 100A, generally comprises a rotor 150A, a stator 110A, and a coil 120A. Rotor 150A comprises a plurality of interleaved magnets 154 and flux concentrators 152. Rotor 150A is configured to interact with stator 110A in order to facilitate switching of magnetic flux. Stator 110A is configured to be magnetically coupled to rotor 150A, and is configured to facilitate flow of magnetic flux via interaction with rotor 150A. Stator 110A at least partially encloses coil 120A. Coil 120A is configured to generate a current output responsive to flux switching and/or accept a current input configured to drive rotor 150A. Transverse flux machine 100A may also comprise various structural components, for example components configured to facilitate operation of transverse flux machine 100A. Moreover, transverse flux machine 100A may comprise any suitable components configured to support, guide, modify, and/or otherwise manage and/or control operation of transverse flux machine 100A and/or components thereof.

In accordance with an exemplary embodiment, and with reference to FIG. 1B, an electrical machine, for example commutated flux machine (CFM) 100B, generally comprises a stator 110B, a rotor 150B, and a coil 120B. Stator 110B comprises a plurality of interleaved magnets 114 and flux concentrators 112. Stator 110B at least partially encloses coil 120B. Stator 110B is configured to interact with rotor 150B in order to facilitate switching of magnetic flux. Stator 110B is configured to be magnetically coupled to rotor 150B, and is configured to facilitate flow of magnetic flux via interaction with rotor 150B. Coil 120B is configured to generate a current output responsive to flux switching and/or accept a current input configured to drive rotor 150B. Commutated flux machine 100B may also comprise various structural components, for example components configured to facilitate operation of commutated flux machine 100B. Moreover, commutated flux machine 100B may comprise any suitable components configured to support, guide, modify, and/or otherwise manage and/or control operation of commutated flux machine 100B and/or components thereof.

Figure 2A:
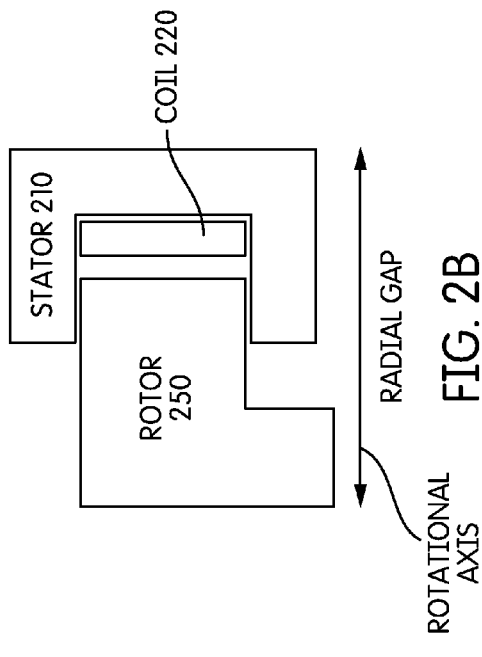
FIG. 2A illustrates an exemplary axial gap configuration in accordance with an exemplary embodiment.
Figure 2B:
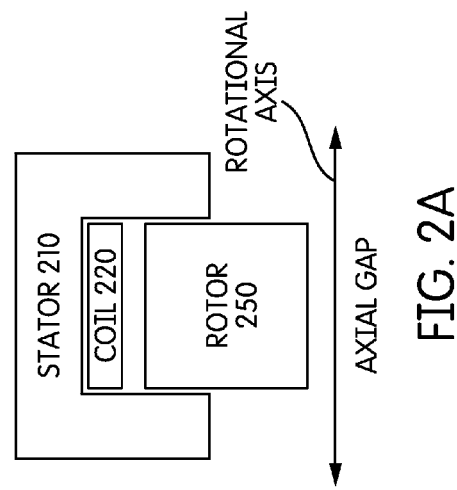
FIG. 2B illustrates an exemplary radial gap configuration in accordance with an exemplary embodiment.

Moreover, transverse flux machines and/or commutated flux machines may be configured in multiple ways. For example, with reference to FIG. 2A, a commutated flux machine may be configured with a stator 210 at least partially surrounding a coil 220 and generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

Figure 3A:
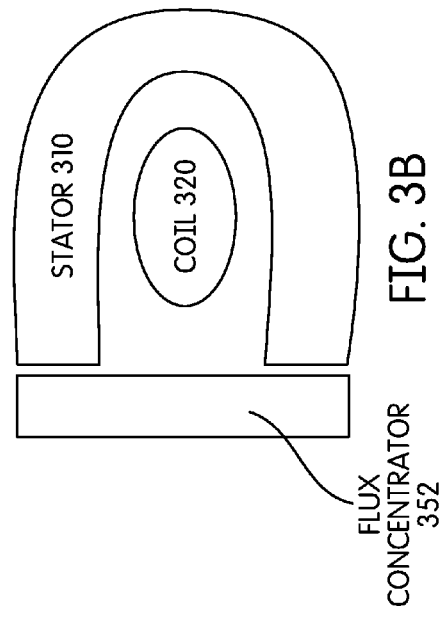
FIG. 3A illustrates an exemplary cavity engaged configuration in accordance with an exemplary embodiment.
Figure 3B:
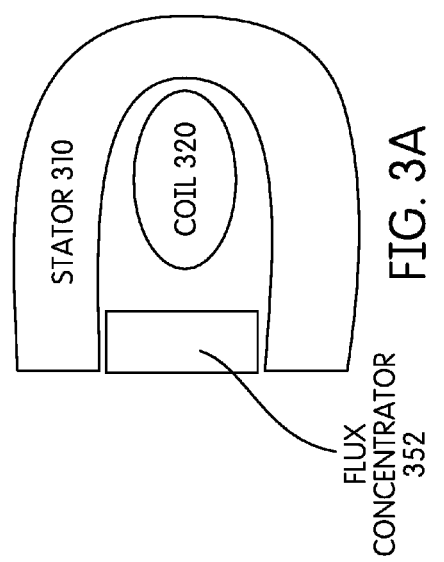
FIG. 3B illustrates an exemplary face engaged configuration in accordance with an exemplary embodiment.
Figure 3C:
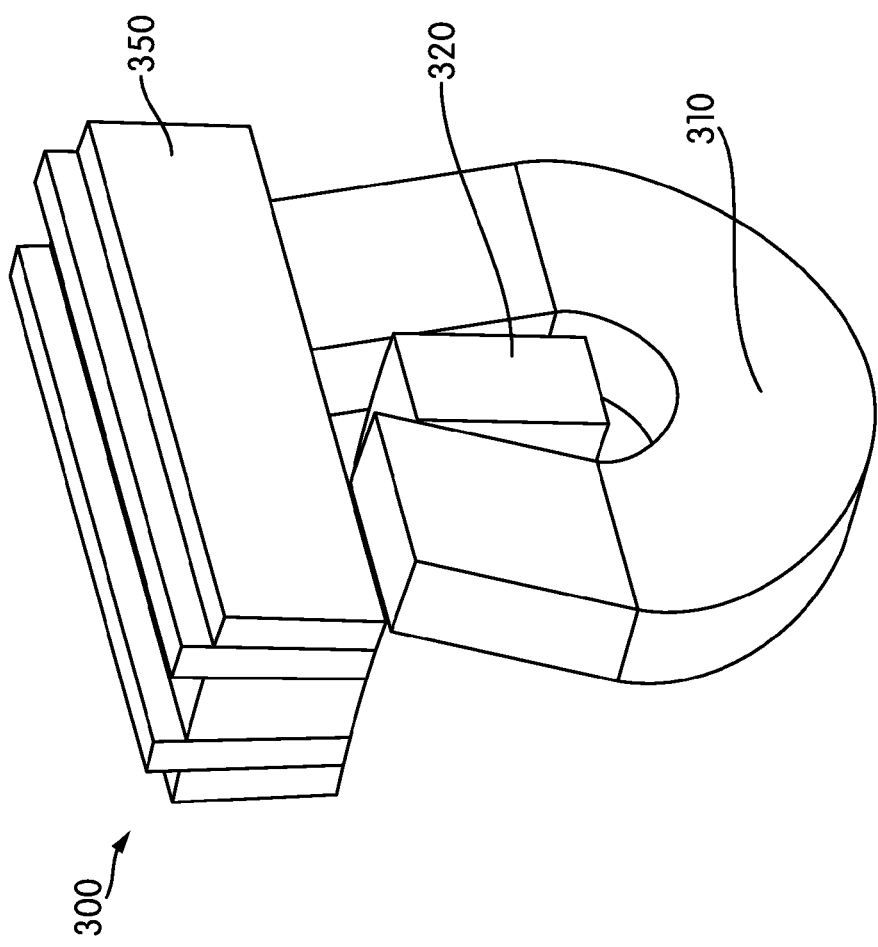
FIG. 3C illustrates an exemplary face engaged transverse flux configuration in accordance with an exemplary embodiment.

With reference now to FIG. 3A, a flux concentrator 352 in a commutated flux machine may engage a stator 310 at least partially surrounding a coil 320 by extending at least partially into a cavity defined by stator 310. Such a configuration is referred to herein as "cavity engaged." Turning to FIG. 3B, flux concentrator 352 in a commutated flux machine may engage stator 310 by closely approaching two terminal faces of stator 310. Such a configuration is referred to herein as "face engaged." Similar engagement approaches may be followed in transverse flux machines and are referred to in a similar manner. In general, it should be noted that a particular electrical machine may be face engaged or cavity engaged, and may be an axial gap or radial gap configuration. For example, in an exemplary embodiment, with reference to FIG. 3C, a transverse flux machine 300 comprises a coil 320 at least partially surrounded by stator 310. Stator 310 is face engaged with rotor 350 in an axial gap configuration.

Principles of operation for various transverse flux machines and/or commutated flux machines, and various other principles related thereto, may be found in one or more of U.S. Pat. Nos. 7,851,965, 7,923,886, 7,868,508, 8,053,944, and 8,405,275, U.S. Patent Application Publication Nos. 2011/0169381, 2011/0169366, 2012/0119599, 2012/0119609, 2012/0119610, 2012/0234108, 2012/0235519, 2012/0235668, 2013/0002061, and 2013/0113320, and U.S. patent application Ser. No. 13/969,447. Each of these patents and patent applications are hereby incorporated herein by reference in its entirety. It may be appreciated that the present disclosure may suitably be combined with one or more of the teachings in these patents and printed publications. For example, principles of the present disclosure may suitably be combined with principles electric motor design and components, including but not limited to those therein.

As described in U.S. Pat. No. 8,405,275, incorporated herein by reference in its entirety, a stator for an electrical machine, such as a transverse flux machine and/or commutated flux machine, may comprise a lamination stack (e.g., a plurality of laminae) formed from a generally planar material configured to transmit magnetic flux. Such lamina may be in a shape configured to facilitate transmission of magnetic flux in a desired manner and/or direction. In an embodiment, the lamina may be assembled side by side into the lamination stack (e.g., as side laminations). In various exemplary embodiments, lamina may comprise a generally ring-shaped structure. It may be appreciated that the ring shaped structure may be arcuate, polygonal, a combination thereof, or of any other appropriate shape or configuration. Moreover, such lamina may be configured with one or more teeth. In an exemplary embodiment, teeth are located on the outer edge of the lamina and/or on the inner edge of the side lamination. In various exemplary embodiments, teeth may be disposed to generally face the radial interior of the ring (for example, in connection with the use of an "inner" rotor in a radial gap configuration), the radial exterior of the ring (for example, in connection with the use of an "outer" rotor in a radial gap configuration), and/or an axial side of the ring (for example, in connection with the use of a "side by side" rotors and stators in an axial gap configuration).

The laminae typically comprise a material suitable for transmission of magnetic flux. In various exemplary embodiments, lamina may comprise silicon steel. In an exemplary embodiment, the lamina may comprise M19 silicon steel. Lamina may also comprise cold rolled grain oriented ("CRGO") silicon steel, nickel-based alloys (e.g., Carpenter brand high-permeability "49" alloy and/or the like), cobalt-based alloys (e.g., Carpenter brand "Hiperco" cobalt-based materials and/or the like), nickel-cobalt alloys, and/or the like. Moreover, lamina may comprise any suitable material having a desired electrical resistivity and/or magnetic permeability.

Other details regarding assembly of the lamina into a stack, which may be assembled into a stator for an electrical machine, are also described in U.S. Pat. No. 8,405,275. It may be appreciated that the teachings therein may be utilized for a rotor of an electrical machine as well. As further described therein, when utilized in certain electrical machines, continuous (for example, ring-shaped) lamina and/or lamination stacks can suffer from undesirable losses due to flux linking of certain laminae, as explained in more detail below. Stated generally, in certain electrical machines, including in transverse flux machines and/or commutated flux machines, any component or combination of components which provide a closed electrical circuit passing through a magnetic flux loop will have an electric current induced therein responsive to variations in the magnetic field. Typically, it is desirable to induce an electrical current in a conductive coil of an electrical machine (i.e. a portion of the electrical machine intended to supply an output current and/or provide an input current), but undesirable to induce an electrical current in other portions of the machine (e.g., portions of the rotor and/or stator intended to facilitate switching of magnetic flux). Such currents induced outside a conductive coil can lead to unwanted eddy currents, thermal losses, and even device failure.

Accordingly, to mitigate the effects of eddy currents and other such unwanted results, U.S. Pat. No. 8,405,275 describes modifying lamina to interrupt a continuous electrical circuit therein. Specifically, the lamina may include one or more cuts or gaps, therein, which may extend completely through the side lamination, breaking the electrical circuit. In some embodiments, the lamina may be formed from spaced segments that are circumferentially arranged to form a generally ring-shaped structure in a transverse flux machine. Each segment may be partially electrically and/or physically separated from one another, either by cutting a generally ring-shaped lamina into segments, or forming the generally ring-shaped lamina from segments. As stated therein, however, while a larger number of cuts or segments more effectively interrupt electrical paths around a lamination stack, the complexity associated with manufacturing such lamination stacks and/or integrating such laminations stacks into a functional electrical machine may also grow with the number of cuts or segments. Accordingly, various mechanisms of joining lamina and maintaining cuts therein are described therein. Additionally, as the number of cuts grows, the voltages induced in the lamina of the lamination stacks are reduced, as each lamination stack extends a shorter angular distance around a transverse flux machine and is thus linked by less magnetic flux. Other techniques of mitigating the effects of eddy currents, such as by utilizing physically unified conductive segments, which may be electrically and magnetically segmented into discrete units in a manner that prevents formation of induced eddy currents (e.g., circumferential currents) in the stator, are described in U.S. patent application Ser. No. 13/969,447, incorporated by reference above.

It may be appreciated that having a plurality of lamina assembled together may increase assembly and component costs more than would be desired, to achieve a potentially unneeded level of efficiency. As noted above, a well-engineered solution having fewer components and/or a simpler manufacturing technique may achieve superior performance at a given price point, which may be desirable for a number of uses.

Figure 4:
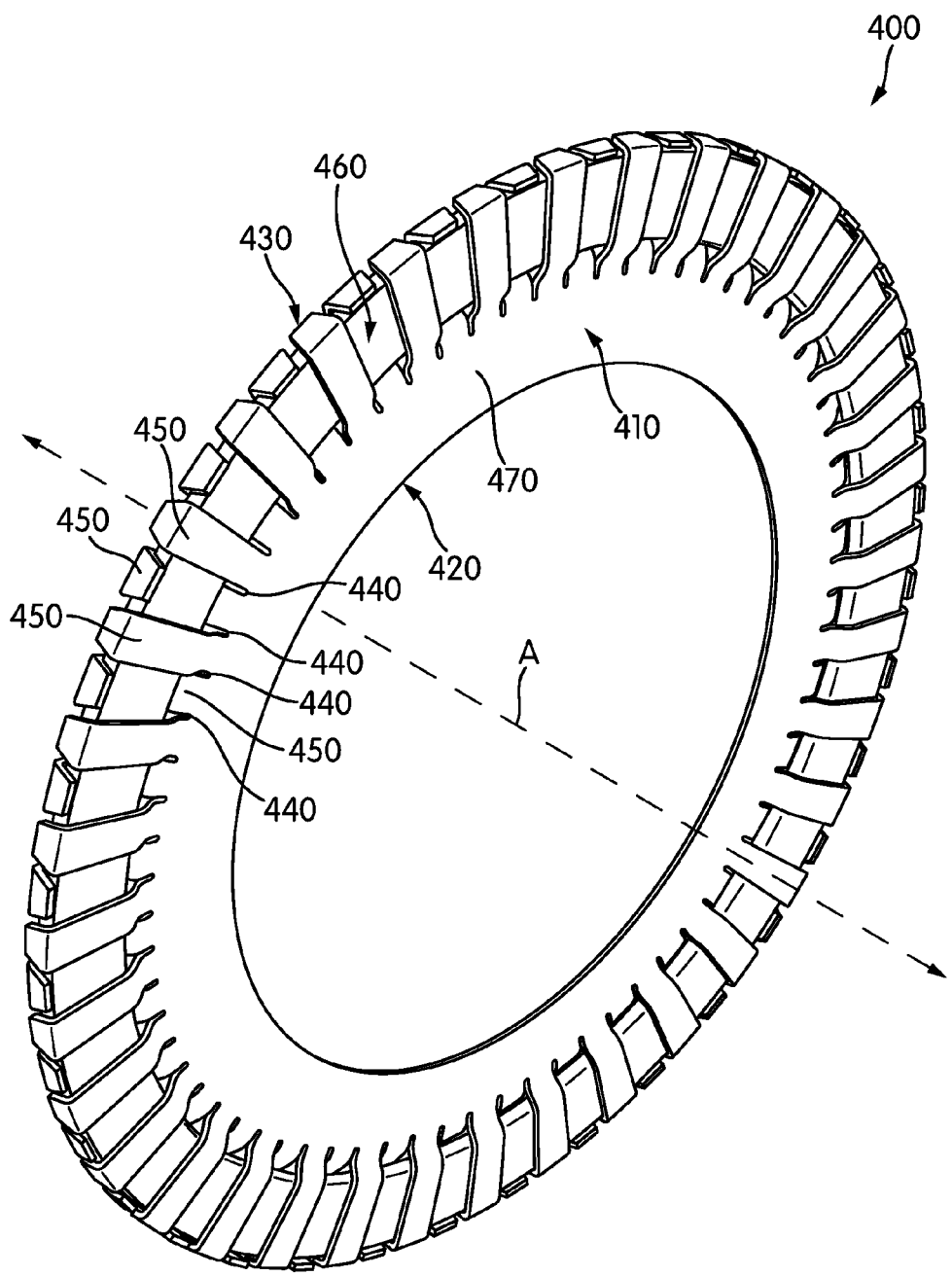
FIG. 4 illustrates an embodiment of a transverse flux stator of the present disclosure.

Such a well-engineered solution is a feature of the present disclosure. Accordingly, FIG. 4 illustrates a transverse flux stator 400 formed with a single lamina 410 (e.g., a sheet of metal, such as silicon steel or another suitable material having a desired electrical resistivity and/or magnetic permeability, including but not limited to those materials described above). In an embodiment, the single lamina 410 may be formed from a single piece of stamped steel. As described herein, the single lamina 410 may have various geometric configurations in various embodiments, facilitating a variety of motors based thereon. In an embodiment, multiple lamina 410 may be formed simultaneously. For example, the multiple lamina 410 may be formed by placing multiple sheets of lamination material may on top of one another, then stamping the sheets by a die corresponding to the desired shape of a lamina 410. Subsequent shaping of the lamina 410 (e.g., bending or shaping of portions of the lamina 410) may commence simultaneously with or subsequent to the stamping.

In the illustrated embodiment, the single lamina 410 may initially be formed (e.g., through a stamping process) as an annular lamina having an inner portion 420 and an outer portion 430 relative to a central axis A. It may be appreciated that the central axis A may be an axis of rotation for the rotor associated with the transverse flux stator 400 (not shown in FIG. 4). In an embodiment, radial cuts into one or more of the inner portion 420 and the outer portion 430 may be utilized to form opposing pairs of teeth (e.g., terminal protruding portions of stator material) and associated flux paths. For example, in the illustrated embodiment, the outer portion 430 of the single lamina 410 is cut or otherwise formed (such as in the stamping process) with a plurality of gaps 440 defining a plurality of radially extending members 450 which may form the teeth. Although the members 450 are configured extend radially relative to the axis of rotation of the rotor in the illustrated embodiment, it may be appreciated that in some embodiments the members of the single lamina 410 may be configured to extend along the axis of rotation, e.g., for a radial gap configuration of stator. While in the illustrated embodiment the gaps 440 are generally linear, in other embodiments, the gaps 440 may have a curved or angled configuration. As shown in FIG. 4, adjacent radially extending members 450 may be bent or otherwise angled in opposing axial directions, so as to form a space that may receive a coil assembly 460 therein, as described in greater detail below. That is, the angles of the radially extending members 450 are alternated so that every other radially extending member 450 is on each axial side of the space for receiving coil assembly 460. While in some embodiments each of adjacent radially extending members 450 may be bent to form the space, in some embodiments, alternate ones of the extending members 450 may be bent, while others alternate ones of the extending members 450 may be generally planar with the uncut portion of the single lamina 410. It may be appreciated then that the single lamina 410 may include a stem portion 470 from which the radially extending members 450 may extend radially from and at least some of which may protrude axially outwards relative to the axis A to define the volume of the space to receive the coil assembly 460.

Figure 5:
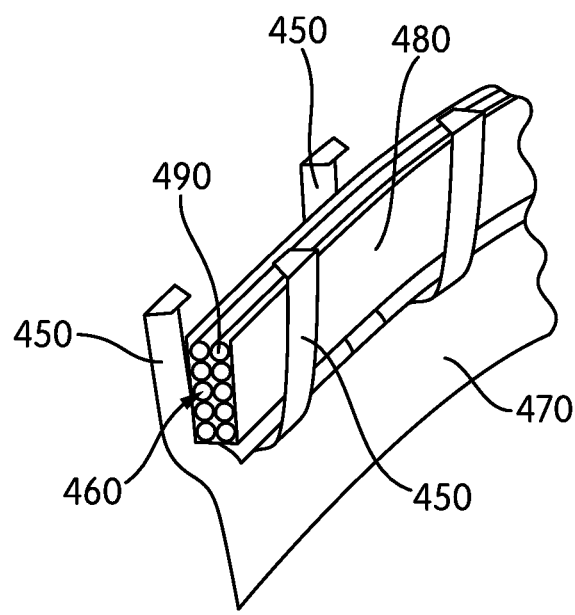
FIG. 5 illustrates a reduced sectional view of the stator of FIG. 4 during an assembly thereof.

As shown in the view of FIG. 5, in an embodiment, each of the radially extending members 450 may be bent away from a space therebetween that may house the coil assembly 460. In some embodiments, the coil assembly 460 may comprise elements or assemblies configured to selectively generate electromagnetic forces in the lamina 410, and may include structures appurtenant thereto. For example, in some embodiments a coil channel 480 may be placed in the space between the radially extending members 450, and a coil 490 may be wound around the transverse flux stator 400 within the coil channel 480 to form the coil assembly 460. In other embodiments, the coil 490 alone, or other configuration of coil assembly 460, may be positioned within the space between the radially extending members 450 directly. In an embodiment, the coil channel 480 may be formed from one or more pieces which may form a groove into which the coil 490 may be wound into. For example, the coil channel 480 may be formed from one or more pieces of insulating material (e.g., plastic, such as formed nylon, or another polymer), which may be secured together (e.g., via pins, snaps, welds, adhesive, or other securements) to form an annular channel into which the coil 490 may wind. It may be appreciated that the application of electric current to the coil in the coil assembly 460 may generate flux fields in the lamina 410 causing rotation of the rotor. Similarly, in some embodiments the application of a moving/variable magnetic force to the transverse flux stator 400 may generate an electric current in the coil of the coil assembly 460 (e.g., in the context of a generator).

Figure 6:
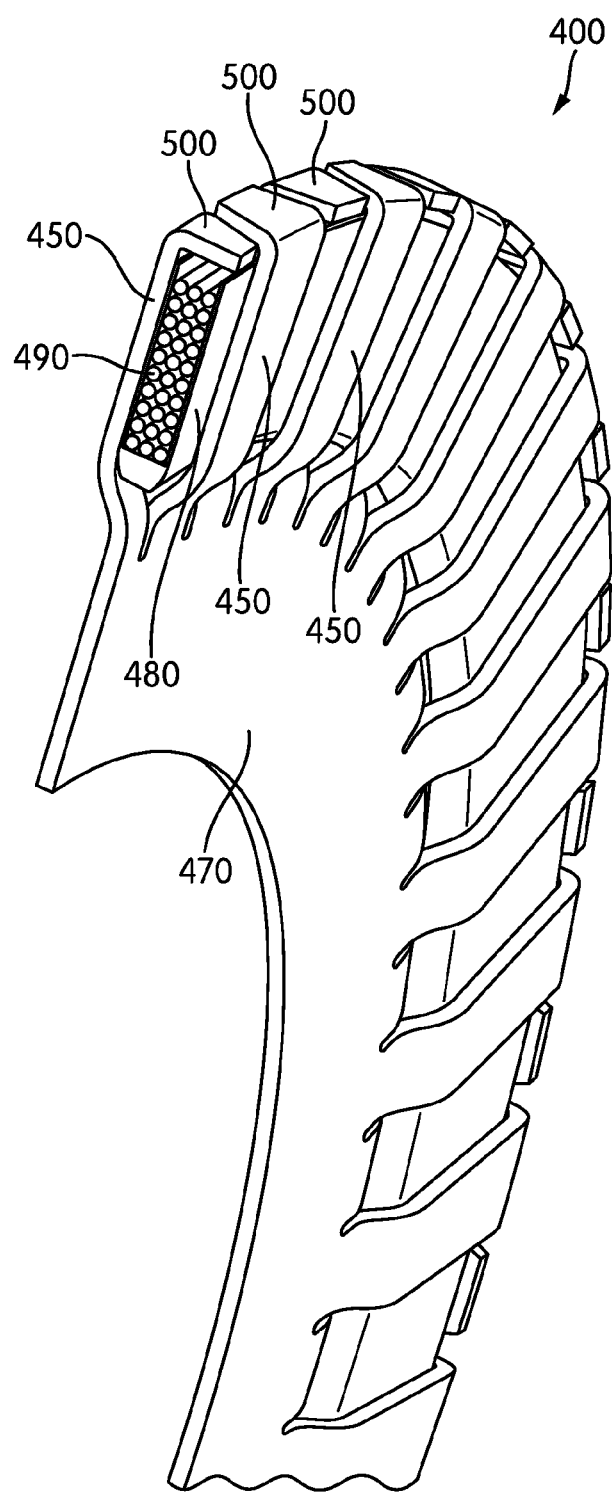
FIG. 6 illustrates a sectional view of the stator of FIG. 4.

As shown in FIG. 6, which illustrates a cross sectional view of the transverse flux stator 400 from FIG. 4, in an embodiment the radially extending members 450 may be bent close to the coil assembly 460 (e.g., after it is placed in the space, or bent initially to form a close configuration of the space, with the coil assembly 460 installed therein). In an embodiment, heads 500 of the radially extending members 450 may interleave with one another to form flux concentrating teeth which may surround the coil assembly 460 therein. Although not beholden to any particular theory of operation it may be understood that the arrangement and configuration of the stator 400 forms desired flux paths when the coil assembly 460 is activated (e.g., through electromagnetic processes, with electric current passing through the coil 490 in the illustrated embodiment). It may be appreciated that the radially extending members 450 may be angled or positioned relative to one another to form the desired flux paths (including but not limited to forming a polyphase configuration, implementing a phase offset, or so on).

Figure 7:
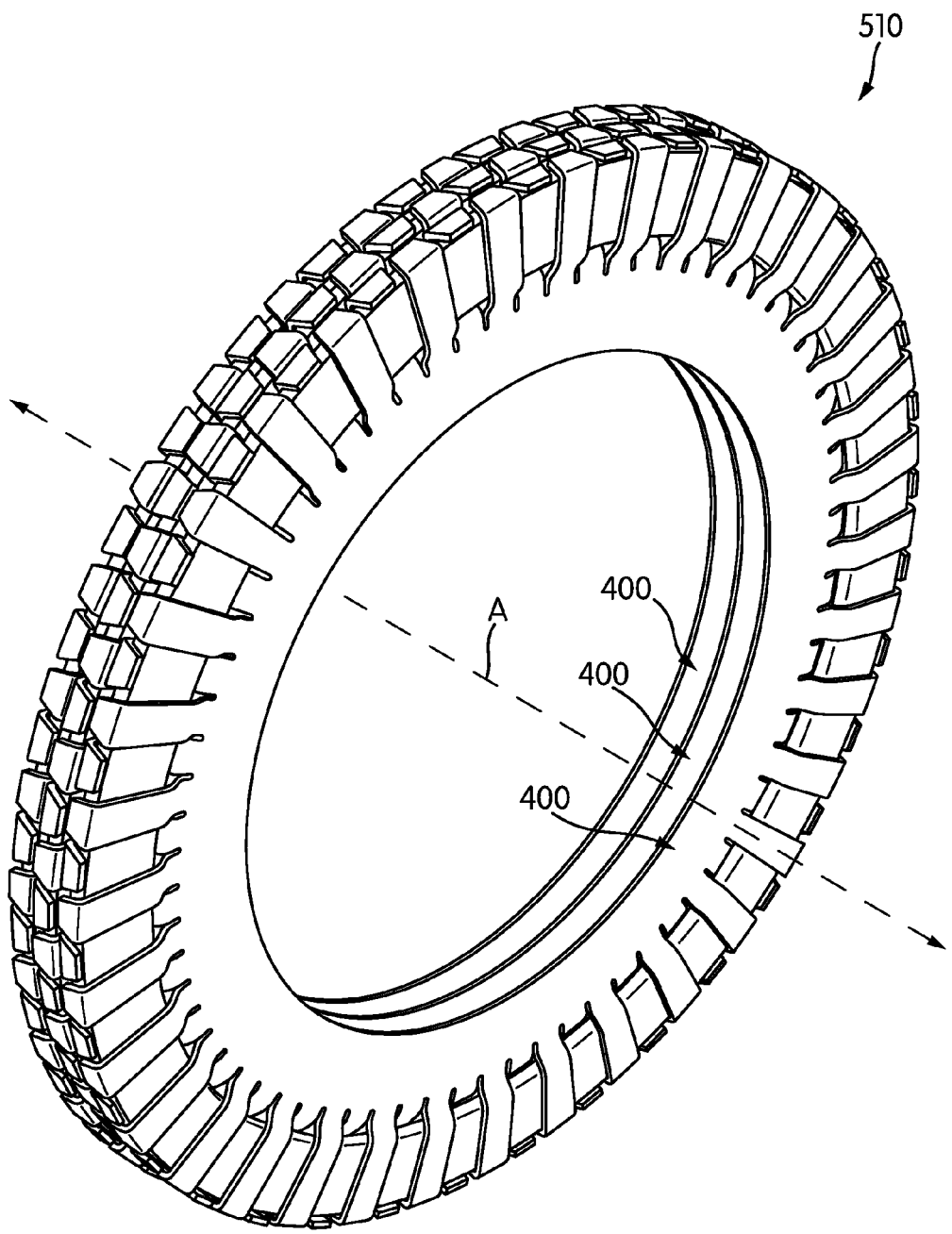
FIG. 7 illustrates an embodiment of a stator formed from a plurality of the stators of FIG. 4.

FIG. 7 illustrates a perspective view of a multiphase stator assembly 510 formed from a plurality of the transverse flux stators 400 positioned adjacent to one another along the axis A. It may be appreciated that the plurality of transverse flux stators 400 in the stator assembly 510 may be utilized in conjunction with an associated rotor assembled concentric thereto. It may be appreciated that in an embodiment the power of the motor may be scalable through use of additional transverse flux stators 400 in the stator assembly 510, utilizing a common rotor.

Figure 8:
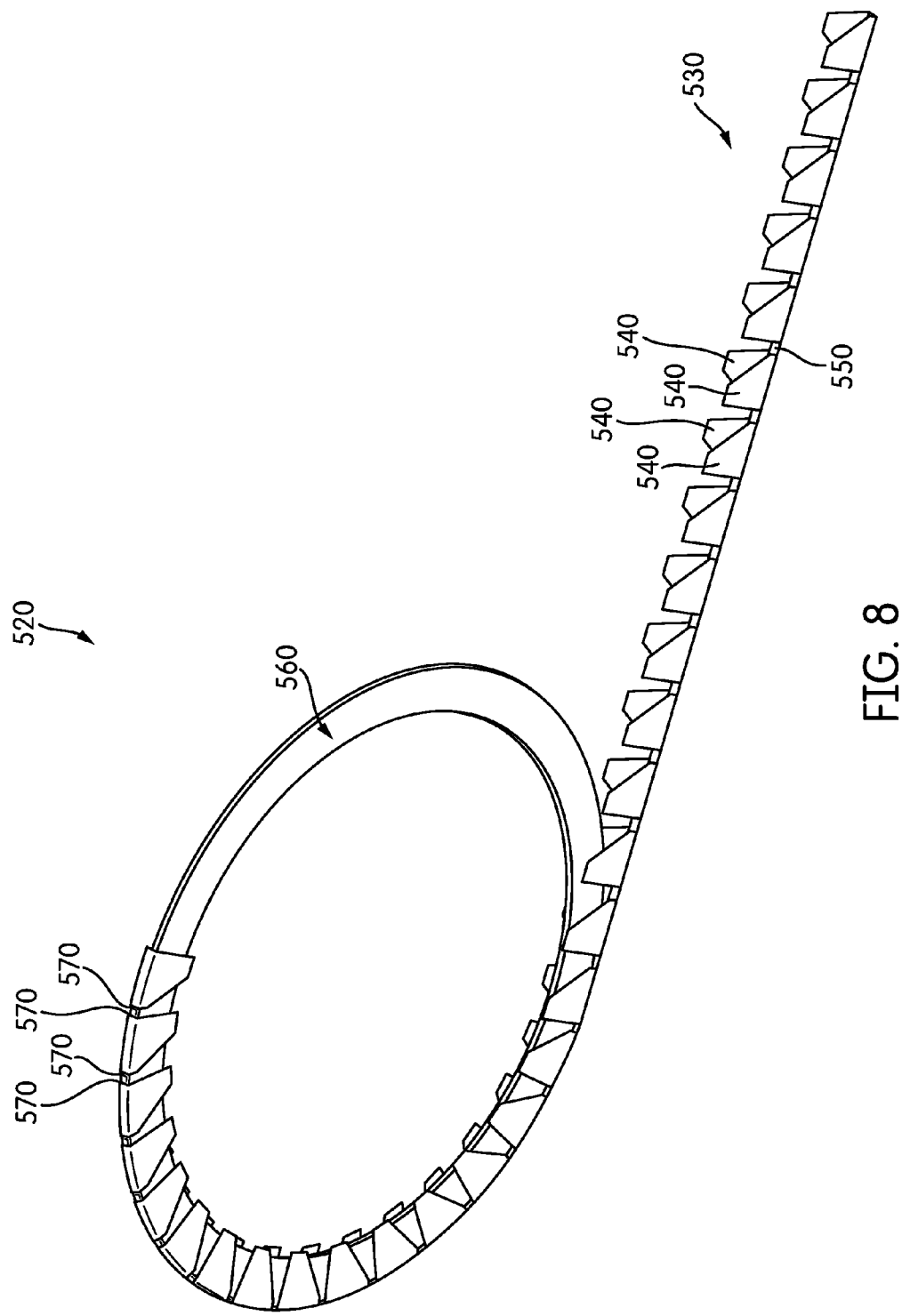
FIG. 8 illustrates an embodiment of a partially assembled stator configured for use with an inner rotor to be positioned therein.

While the embodiment of FIGS. 4-7 depict a transverse flux stator configured as an inner stator that would be utilized with an exterior rotor configured to surround and rotate about the inner stator, it may be appreciated that in some embodiments the teachings herein may be utilized to construct a transverse flux stator configured to be utilized as an exterior stator for use with an interior rotor configured to rotate within the exterior stator. For example, as illustrated in FIG. 8, a transverse flux stator 520 configured to be utilized with an interior rotor may be formed from a strip of stator material 530 which may be cut, die pressed, or otherwise formed in an elongated manner configured to form a plurality of radially extending members 540. As shown, the radially extending members 540 may protrude from a connecting portion 550. As shown, the strip of stator material 530 may be wound around a coil assembly 560, which may be positioned within a channel defined by opposing radially extending members 540 on opposite sides of the connecting portion 550. In an embodiment, the coil assembly 560 may be similar in configuration to the coil assembly 460, and may comprise a coil, which may be wound within a coil channel. It may be appreciated that in some embodiments the coil may be of a unitary construction around which the strip of stator material 530 is positioned. In an embodiment where the coil assembly 560 comprises a coil channel, the coil channel may itself be of a unitary construction.

As shown in the illustrated embodiment of the transverse flux stator 520, the connecting portion 550 may be formed with thinner regions 570 thereon (e.g., pressed to a reduced thickness, or containing perforations) configured to facilitate wrapping the strip of stator material 530 around the coil assembly 560. It may be appreciated that in some embodiments, head portions may be formed on the radially extending members 540, similar to the head portions 500, which may be folded inward over the coil assembly 560, creating flux concentrating teeth that may interleave with one another to secure the strip of stator material 530 around the coil assembly 560, and form desired flux paths when the coil assembly 560 is activated (e.g., current is passed through the coil), to engage the inner rotor associated with the transverse flux stator 520. In other embodiments, such as that illustrated, the tip of each radially extending member 540, generally without being bent relative to the remainder of the radially extending member 540, may be utilized to form the desired flux path for the transverse flux stator 520. It may also be appreciated that the connecting portion 550 or the radially extending members 540 may be angled or positioned relative to one another to form the desired flux paths (including but not limited to forming a polyphase configuration, implementing a phase offset, or so on).

Figure 9A:
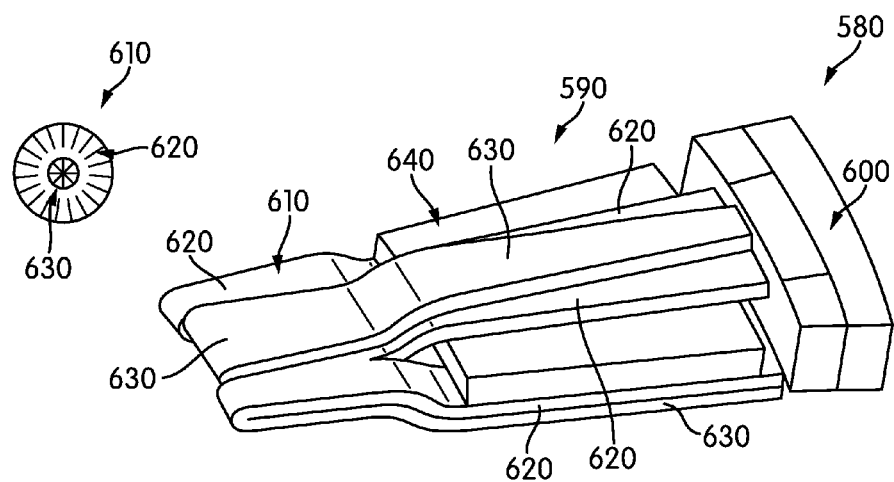
FIGS. 9A and 9B illustrates reduced perspective views of stators formed lamina that utilize folding inner material to the outer portion of the lamina.
Figure 9B:
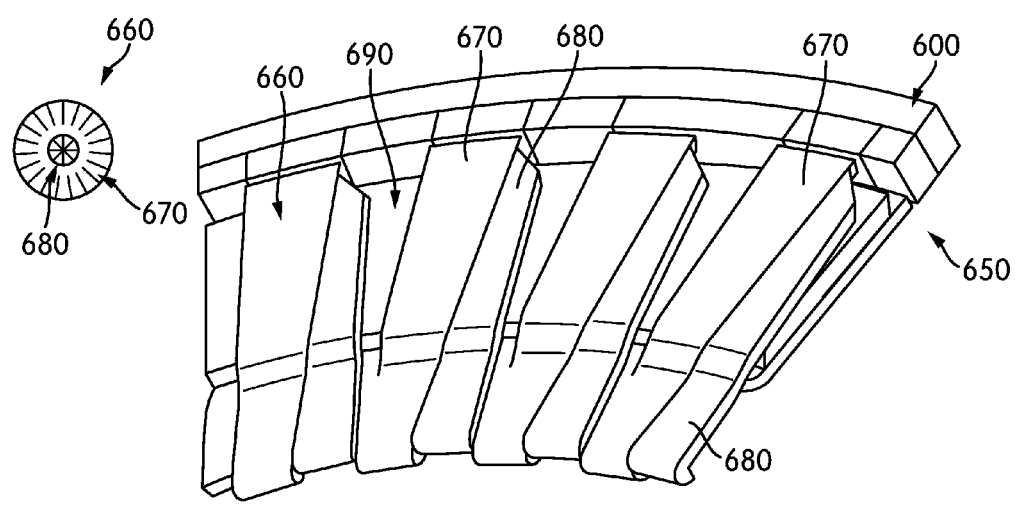

Although the embodiment of FIG. 8 illustrates the transverse flux stator 520 being formed from a strip of stator material 530, it may be appreciated that in an embodiment the transverse flux stator 520, being configured for use with an inner rotator, may be formed from a stamped lamination having an annular configuration with cuts or gaps formed in the inner portion of the annulus to form radially extending members extending in alternating axial directions to form the opposing pairs of teeth and associated flux paths. In some embodiments, segments of the inner portion of a single lamina may be cut (e.g., as part of a press stamping process, or otherwise) and folded towards the outer portion of the single lamina to form an annulus configuration. For example, FIG. 9A illustrates a reduced sectional perspective view of an embodiment of a transverse flux motor 580 with segments of a stator 590 and an associated rotor 600 shown therein. As shown, the stator 590 may be formed from a single lamina 610 shaped by cutting (or otherwise forming) an annulus having an outer portion 620 and an inner portion 630, wherein the outer portion 620 is bent outwards to form a space for a coil assembly 640, which may be similar to the coil assemblies 460 and 560, as described above. As shown in the illustrated embodiment, however, segments from the inner portion 630 may be folded outwards over the outer portion 620, to increase the available flux path area. Specifically, by folding the inner lamination material from the inner portion 630 alongside the outer portion 620, the size of the flux path may be increased. As further shown in FIG. 9B, in an embodiment a transverse flux stator 650 may be configured as shaped from a single lamina 660, by cutting (or otherwise forming) an annulus having an outer portion 670 and an inner portion 680, wherein the outer portion 670 is bent outwards to form a space for a coil assembly 690, which may be similar to the coil assemblies 460 and 560, as described above. As shown in the illustrated embodiment, however, segments of the inner portion 680 may be folded towards the outer portion 670, and may align adjacent to the outer portion 670 to increase the available flux path area, in a manner that would not increase the thickness of the transverse flux stator 650.

Figure 10:
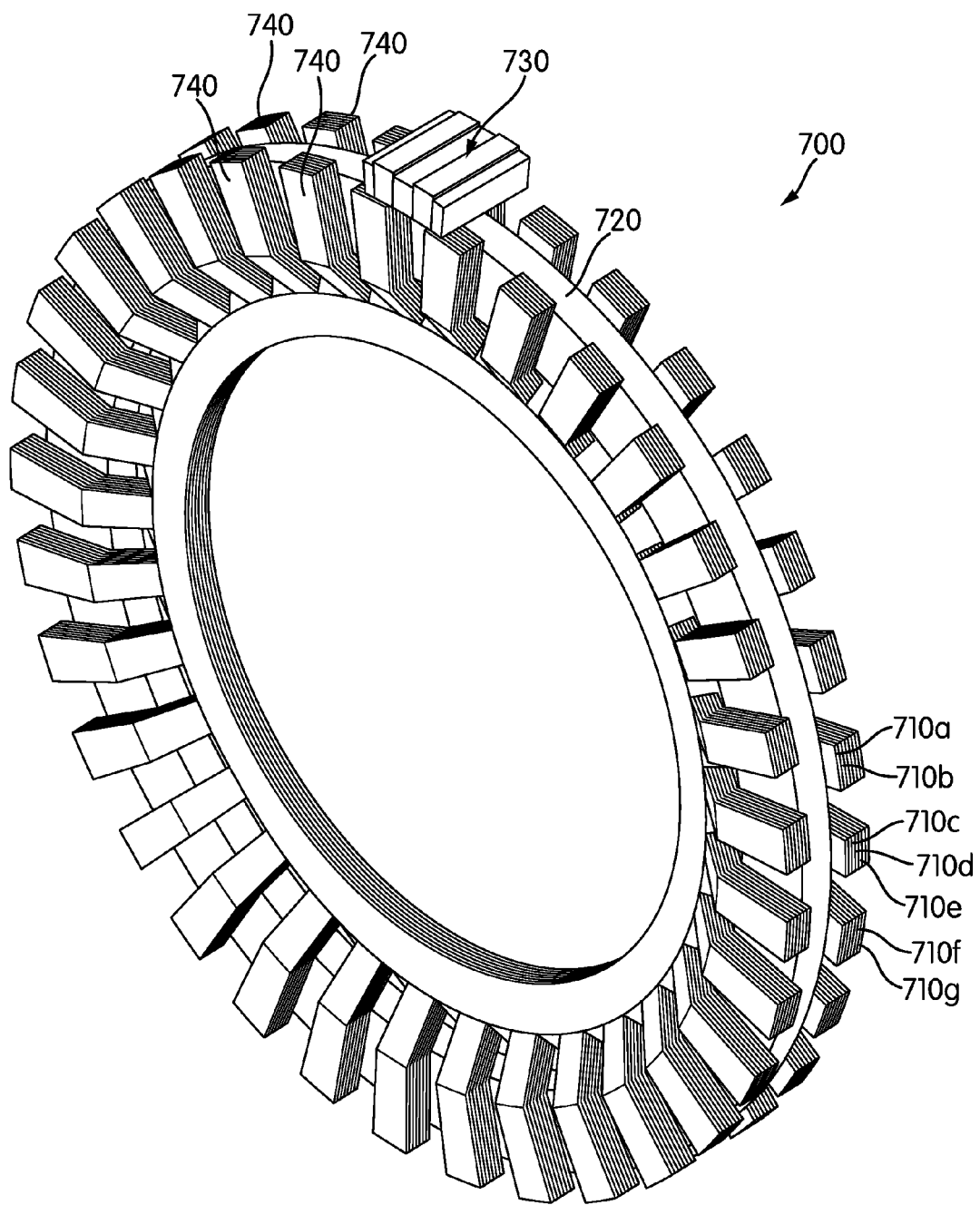
FIG. 10 illustrates an embodiment of a stator formed from a plurality of lamina stacked adjacent to one another, having an outer rotator configuration.
Figure 11:
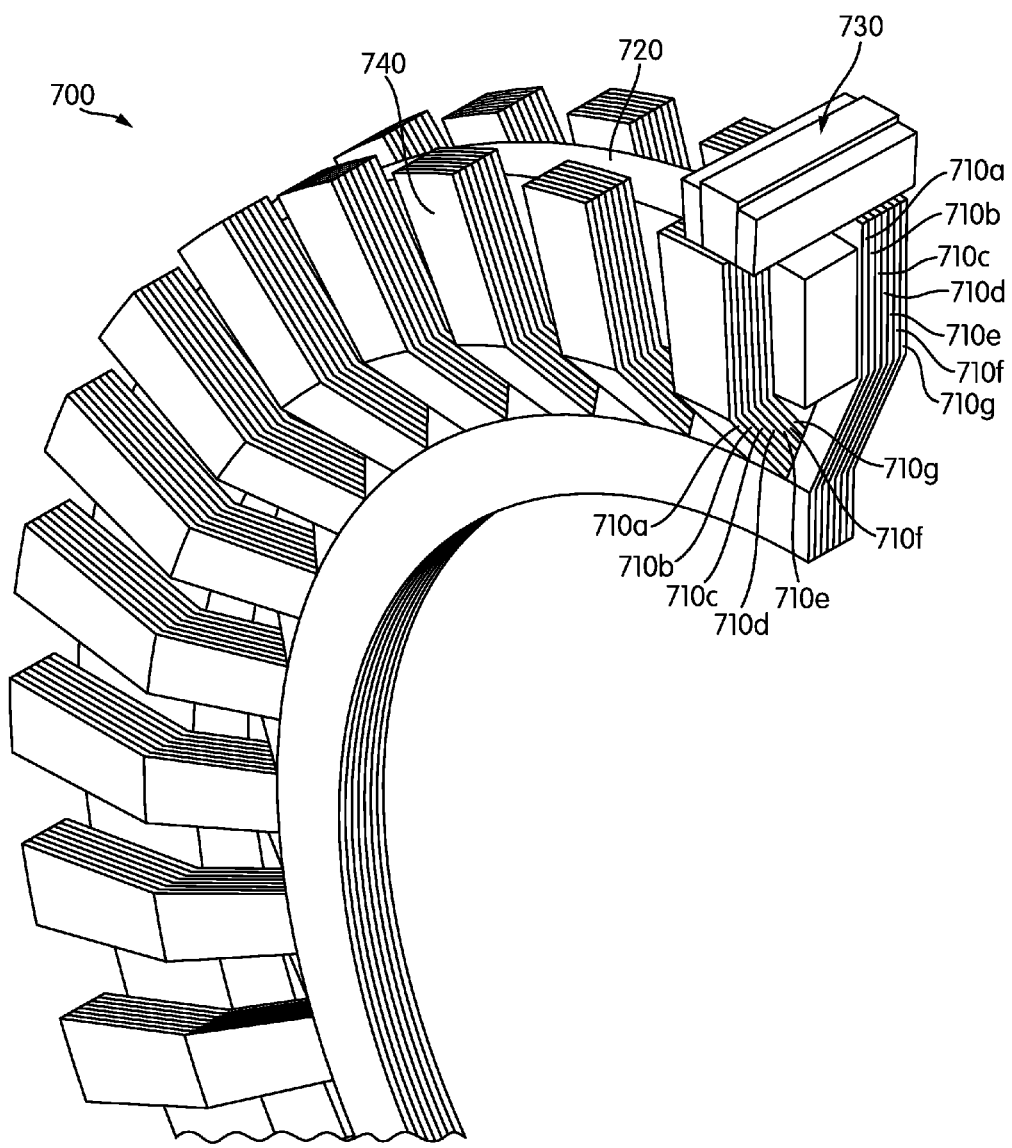
FIG. 11 illustrates a cross sectional view of the stator of FIG. 10.
Figure 12:
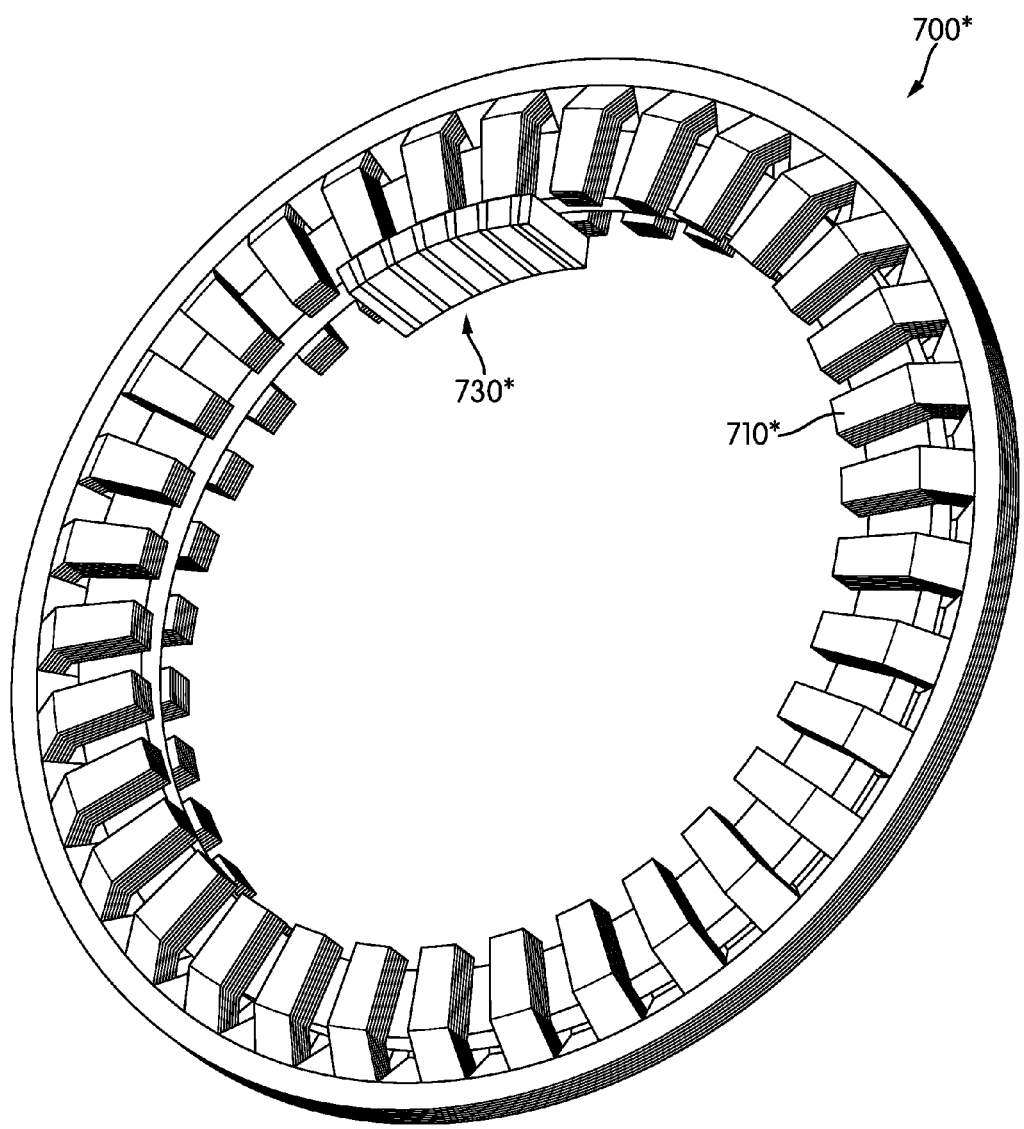
FIG. 12 illustrates another embodiment of a stator formed from a plurality of lamina staked adjacent to one another, having an inner rotator configuration.

In some embodiments, the single lamina forming both opposing pairs of teeth may be stacked with other lamina that also form both opposing pairs of teeth, to provide additional cross-sectional area for the flux channel. For example, FIGS. 10 and 11 illustrate a transverse flux stator 700 formed from a plurality of lamina 710 (individually lamina 710*a-g*), each of which is configured to surround a coil assembly 720, and form the opposing pairs of teeth for the transverse flux stator 700. In an embodiment, the coil assembly 720 may be similar to the coil assemblies 460 and 560 described above. A reduced view of a portion of a rotor 730 is also depicted. It may be appreciated that in an embodiment each lamina 710 may be formed similarly to the single lamina 410, however in a manner configured for stacking of the lamina 710 adjacent to one another. Accordingly, in an embodiment each radially extending member 740 of the may be lamina 710 may be spaced relative to one another to facilitate the stacking. In an embodiment, certain of the lamina 710 may be different from other of the lamina 710, such as at the radially extending members 740 thereof, to facilitate the stacking of the lamina 710 (e.g., with the radially extending members 740 protruding outwards further than others of the radially extending members to facilitate proper positioning relative to one another, or to create appropriate space for the coil assembly 720). Accordingly, it may be appreciated that the outermost layered tips of the radially extending members 740 of the lamina 710 may together face the rotor 730, and serve as the face of a tooth of the transverse flux stator 700. As shown in FIG. 12, an embodiment of the transverse flux stator 700 (as transverse flux stator 700*) formed from a plurality of the lamina 710 (as lamina 710*) may have an inner rotor stator configuration. A partial view of an rotor 730* configured to rotate within the transverse flux stator 700* is also illustrated. Other variations of transverse flux stator 700 are also possible in other embodiments.

Figure 13:
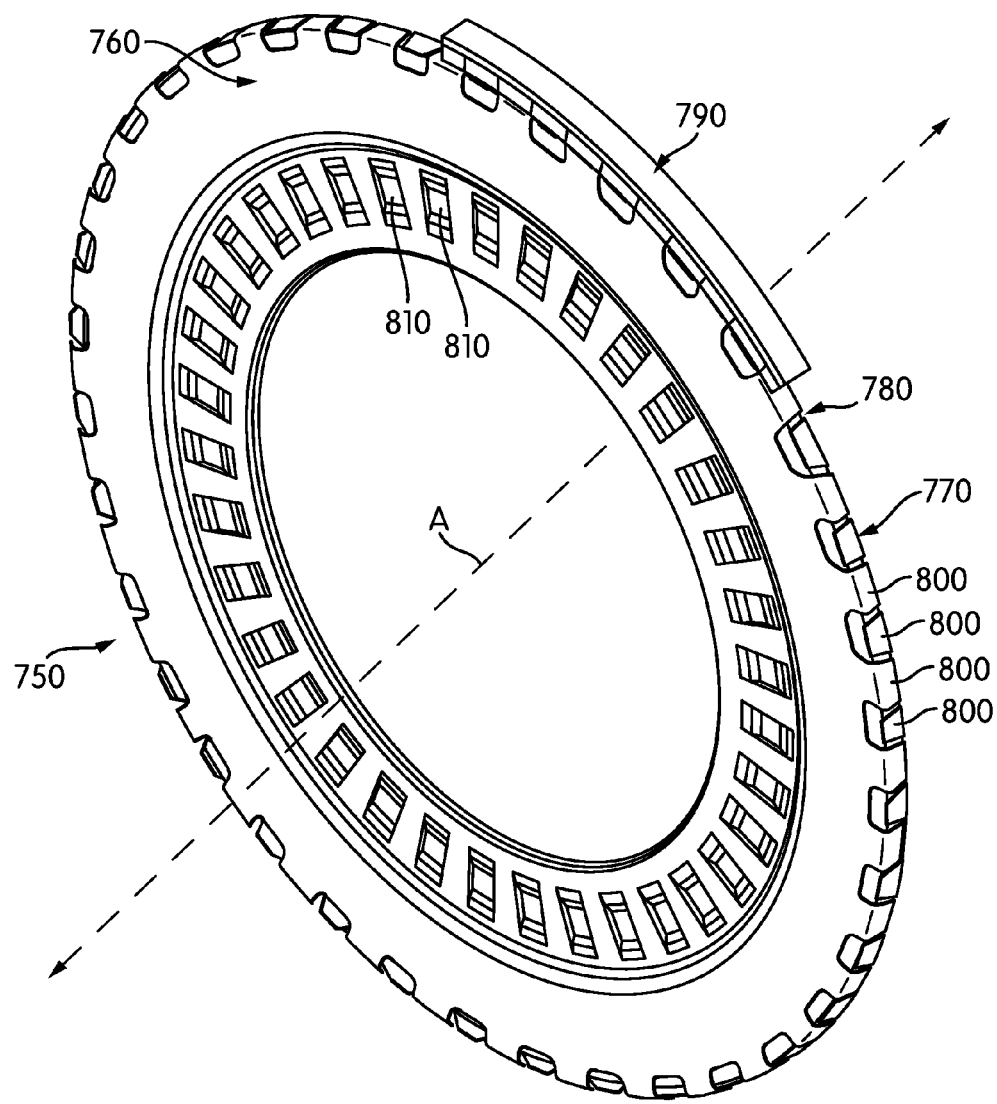
FIG. 13 illustrates another embodiment of a stator of the present disclosure, utilizing a pair of lamina to surround a coil therein.
Figure 14:
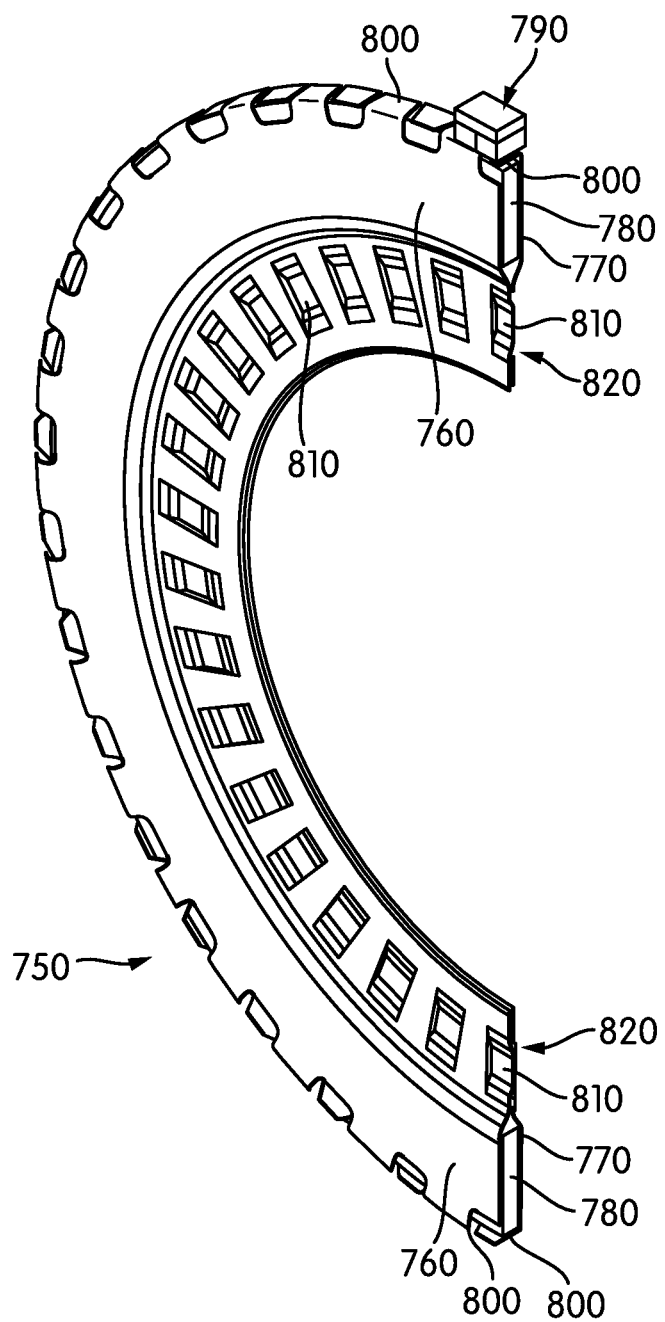
FIG. 14 illustrates a cross sectional view of the stator of FIG. 13.

While in some embodiments the single piece lamina comprises opposing pairs of teeth and associated flux paths (e.g., the unitary body is configured to surround both sides of the coil), it may be appreciated that in other embodiments the stator may comprise a pair of laminae, which when assembled together are configured to sandwich the coil therebetween. For example, FIGS. 13 and 14 illustrate a transverse flux stator 750 formed from a first lamina 760 and a second lamina 770, which together are configured to surround a coil 780, and form the opposing pairs of teeth for the transverse flux stator 750. A reduced view of a portion of a rotor 790 is also depicted. It may be appreciated that in an embodiment each lamina 760 and 770 may be formed similarly to the lamina 410, however in a manner configured for assembly together around the coil 780. Accordingly, in an embodiment each lamina 760 and 770 may include radially extending members 800, which may be bent or otherwise formed to extend in an axial direction parallel to the axis of rotation A for the rotor 790, and thus may envelop the coil 780, as shown. As further shown in FIGS. 13 and 14, in an embodiment each of the lamina 760 and 770 may include features configured to secure the lamina 760 to the lamina 770, or otherwise position the lamina 760 relative to the lamina 770 for assembly into the transverse flux stator 750. As an example, in the illustrated embodiment the lamina 760 includes embossing 810 that extends into apertures 820 in the lamina 770, which may align and/or snap the lamina 760 to the lamina 770. In an embodiment, the embossing 810 and apertures 820 may be outside of the desired flux paths, to prevent undesirable eddy currents or current/flux paths associated therewith. Other mechanisms to secure the lamina 760 to the lamina 770 are also possible in various embodiments, including but not limited to tack or spot welds, pins, snaps, adhesive, or other securements.

Figure 15A:
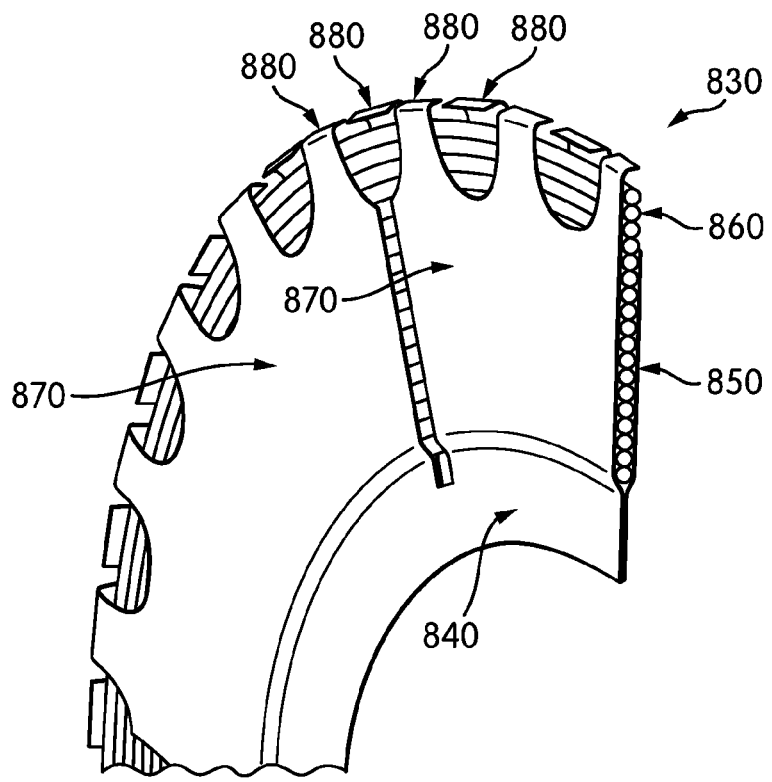
FIGS. 15A and 15B illustrate cross sectional and assembled views of stators of the present disclosure, formed utilizing a pair of lamina to surround a coil, where the stator may be stacked adjacent to other stators to build a larger stator assembly.
Figure 15B:
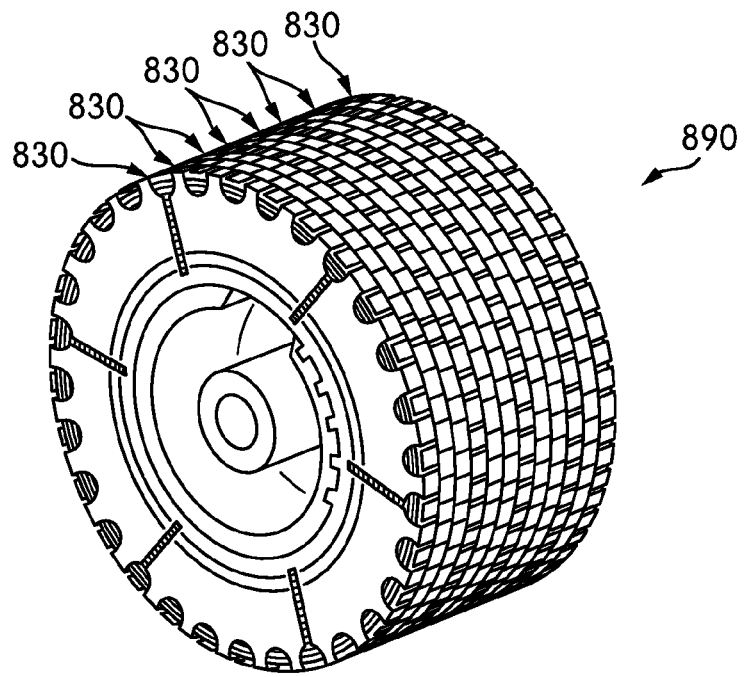

FIGS. 15A-B illustrate another embodiment of a transverse flux stator comprising a pair of lamina surrounding a coil, which may be scalable to provide a desired performance. For example, FIG. 15A illustrates a transverse flux stator 830 comprising a lamina 840 and a lamina 850, which may together surround a coil 860. As shown in the illustrated embodiment, in some embodiments the coil 860 may be formed by wrapping electrically conductive wire within a space formed by the combination of the lamina 840 and the lamina 850. As further shown, in an embodiment one or more of the lamina 840 and the lamina 850 may be configured to form segments 870 comprising groups of radially extending segments 880 associated with that lamina (840 or 850). As shown in FIG. 15B, in an embodiment a plurality of the transverse flux stators 830 may be stacked together to form in their combination a higher performance transverse flux stator 890.

Figure 16:
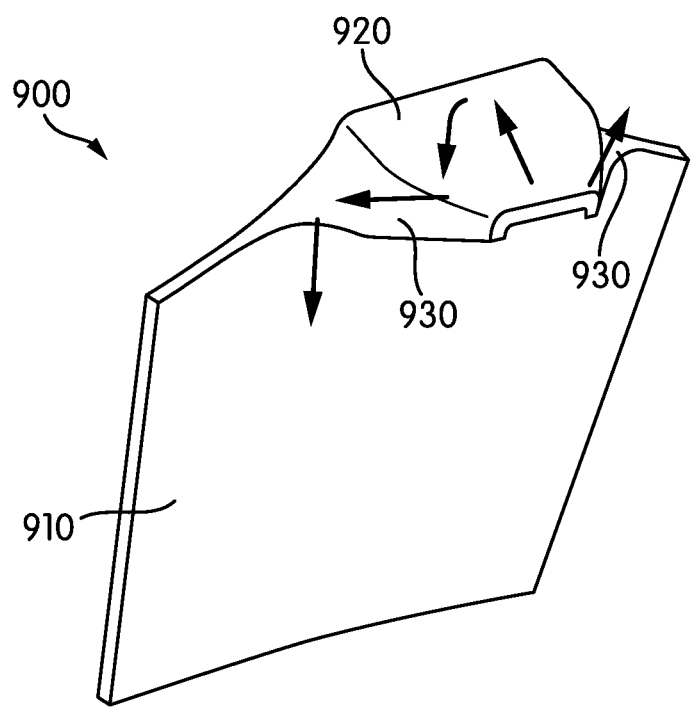
FIG. 16 illustrates an embodiment of a portion of a lamina configured to improve flux paths therein.

In some embodiments described herein, radially extending members of the stators may be formed by creating gaps between each of the radially extending members, and bending at least a portion of a head of the radially extending member. The bent heads may be folded axially inwards to form alternating heads, which may extend over the coil, and create flux concentrating teeth interleaved with one another to create desired flux paths and flux switches. Examples of such embodiments are illustrated as with the head portions 500 of transverse flux stator 400, or with the head portions of the radially extending members 800 or 880 illustrated in the assemblies of transverse flux stators 750 and 830. As illustrated in FIG. 16, in other embodiments, the lamina may be constructed through other mechanisms which may create angled or sloped configurations of the head portions of the radially extending members, which may provide an improved flux path from an outermost exterior surface of the head portion to the remainder of the laminae.

In particular, FIG. 16 illustrates a radially extending member 900 which may be integral to other radially extending members on a lamina of a transverse flux stator. In an embodiment, the lamina comprising the radially extending member 900 may be formed utilizing a progressive die press process. In an embodiment, the lamina may be formed through a casting process. As shown, in an embodiment the radially extending member 900 may have a planar portion 910 which may extend radially from an axis of rotation for a rotor associated with the transverse flux stator. A head portion 920 may extend generally axially relative to the axis of rotation, similarly to the head portions of other embodiments described herein. As further shown, however, in an embodiment the radially extending member 900 may include one or more hood portions 930 coupling sides of the head portion 920 to the planar portion 910. As shown, in an embodiment the hood portions 930 may be sloped. In other embodiments, the hood portions may have an angled configuration, or may include a combination of slopes and angles, to extend from the sides of the head portion 920 to the planar portion 910. It may be appreciated that in an embodiment the head portion 920 adjacent to the planar portion 910 may itself have an angled or sloped configuration, such that at least a portion of the head portion 920 slopes or angles towards the planar portion 910, without forming a direct right angle turn from the planar portion 910 to the head portion 920. It may be appreciated that in various embodiments, the head portion 920 may have a plurality of facets associated therewith, and may itself taper inwards, as shown in the embodiment of FIG. 16. It may be appreciated that in an embodiment the radially extending member 900 having the head portions 920 may facilitate flux collection in the air gap between adjacent radially extending members 900.

It may be appreciated that the teachings described herein may be applicable to both interior rotor and exterior rotor configurations of stators. In some embodiments, the combination of stator and rotor may be utilized in forming a motor or a generator. It may be appreciated that the rotor may vary across embodiments, and in some embodiments may comprise rubberized or otherwise flexible magnets assembled in an annular configuration to surround or be received within the stator (in inner rotor or outer rotor stator configurations), or in various embodiments of flux concentrating rotors.

It may be appreciated that principles of the present disclosure may suitably be combined with any number of principles disclosed in any one or more of the U.S. patents and/or patent applications incorporated by reference herein. Thus, for example, a particular transverse flux machine and/or commutated flux machine may incorporate use of segmented stator laminations, use of rainbow-like back return laminations, use of a dual wound coil, use of a lamination stack with powdered metal teeth, use of a sixth-phase offset, use of extended magnets, use of an overhung rotor, use of stator tooth overlap, use of a tape wound rotor, use of a multipath rotor, use of a partial stator, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

Accordingly, although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An electrical machine, comprising:
   a rotor for rotation about a rotational axis;
   a coil arranged circumferentially with respect to and encircling the rotational axis;
   wherein the coil extends in a single plane about the rotational axis; and
   a stator assembly comprising:
   a ring shaped lamina structure formed from and consisting of a piece of planar material and comprising:
   a stem portion formed from said planar material;
   a plurality of gaps in the ring shaped lamina that extends radially from the stem portion to an edge of the ring shaped lamina structure, wherein said gaps form
   a plurality of radially extending members in said planar material that are integral with and extending from said stem portion to form a plurality of opposing extending members about the coil;
   wherein a first set of extending members are configured on a first side of said coil and a second set of extending members are configured on a second, and opposing side from said first side, of said coil;
   wherein the first set and second set of extending members form a coil channel that extends circumferentially with respect to said rotational axis and wherein the coil is configured in said coil channel
   wherein a first set of extending members and second set of extending member are formed from the same piece of planar material; and
   wherein the electrical machine is a transverse flux machine.

2. The electrical machine of claim 1, comprising at least one electrical segmentation gap in the ring shaped lamina that extends between two adjoining radially extending members and substantially through a magnetic flux path portion of the stem portion to reduce eddy currents.

3. The electrical machine of claim 1, wherein the plurality of radially extending members are configured in an alternating axial configuration about a coil, wherein a first radially extending member is configured on a first axial side of the coil and a second and adjacent radially extending member, to said first radially extending member, is configured on a second and opposing axial side of the coil to form a coil channel that extends circumferentially with respect to said rotational axis and wherein the coil is configured in said coil channel.

4. The electrical machine of claim 1, wherein the first and second set of extending members each have an extended end and wherein a tooth is coupled with each of said extended ends to form a plurality of teeth that extend axially.

5. The electrical machine of claim 4, wherein a coil space is formed in the rotational axis between a first and second set of teeth, whereby said coil space is configured for placement of a coil into a coil channel through said coil space.

6. The electrical machine of claim 4, wherein the plurality of teeth extend at least partially over the coil.

7. The electrical machine of claim 4, wherein the plurality of teeth are integral with the radially extending members.

8. The electrical machine of claim 4, wherein the tooth comprises a head portion that extends axially from a radially extending portion of the radially extending members; and
   wherein the head portion extends axially to an extended end.

9. The electrical machine of claim 8, further comprising one or more hood portions that extend from either side of the head portion to the radially extending portion of the extending members; and
   wherein the hood portions are slope from either side of the head portion to the radially extending portion of the extending members.

10. The electrical machine of claim 4, wherein the rotor is located radially inward from the stator assembly.

11. The electrical machine of claim 1, wherein the plurality of radially extending member are configured in an alternating axial configuration about a coil, wherein a first radially extending member is configured on a first axial side of the coil and a second and adjacent radially extending member to said first radially extending member is configured on a second and opposing axial side of the coil to form a coil channel that extends circumferentially with respect to said rotational axis and wherein the coil is configured in said coil channel.

12. The electrical machine of claim 1, wherein the plurality of radially extending members extend radially out from the stem portion.

13. The electrical machine of claim 1, wherein the plurality of radially extending members extend radially in from the stem portion.

14. The electrical machine of claim 1, wherein the coil consists essentially of aluminum.

15. The electrical machine of claim 1, comprising a first ring shaped lamina structure that is stacked adjacent to a second ring shaped lamina structure in the stator assembly to form a multi-phase electrical machine.

16. The electrical chine of claim 1, wherein the rotor comprises one or more flexible magnets.

17. The electrical machine of claim 1, wherein the electrical machine is a motor, and wherein a current applied to the coil induces magnetic flux in the ring shaped lamina structure and to rotate the rotor.

18. The electrical machine of claim 1, wherein the electrical machine is a generator, and wherein rotation of the rotor generates magnetic flux in the ring shaped lamina structure to induce current in the coil.

* * * * *